(12) United States Patent
Tovino

(10) Patent No.: US 9,008,076 B2
(45) Date of Patent: Apr. 14, 2015

(54) TELEPHONY SYSTEM WITH INTELLIGENT ENDPOINTS OR INTELLIGENT SWITCHES TO REDUCE DEPENDENCY OF ENDPOINTS ON APPLICATION SERVER

(75) Inventor: Michael S. W. Tovino, Bend, OR (US)

(73) Assignee: ShoreTel, Inc., Sunnyvale, CA (US)

( * ) Notice: Subject to any disclaimer, the term of this patent is extended or adjusted under 35 U.S.C. 154(b) by 1335 days.

(21) Appl. No.: 12/415,586

(22) Filed: Mar. 31, 2009

(65) Prior Publication Data
US 2010/0246568 A1    Sep. 30, 2010

(51) Int. Cl.
H04L 12/66    (2006.01)
H04M 7/00    (2006.01)

(52) U.S. Cl.
CPC .................................. H04M 7/0012 (2013.01)

(58) Field of Classification Search
CPC .................................................... H04M 1/2473
USPC ............ 370/352; 379/211.02, 220.01; 341/22
See application file for complete search history.

(56) References Cited

U.S. PATENT DOCUMENTS

| | | | |
|---|---|---|---|
| 6,930,999 B1 * | 8/2005 | Craig et al. .................... | 370/352 |
| 7,003,091 B1 | 2/2006 | Burns et al. | |
| 2006/0233340 A1 * | 10/2006 | Tovino et al. ............ | 379/211.02 |
| 2007/0096947 A1 * | 5/2007 | Basart et al. ..................... | 341/22 |
| 2008/0159272 A1 * | 7/2008 | McClung et al. ............. | 370/352 |
| 2008/0205622 A1 * | 8/2008 | Robesky .................. | 379/220.01 |
| 2009/0316687 A1 * | 12/2009 | Kruppa ......................... | 370/352 |

OTHER PUBLICATIONS

International Search Report, PCT/US2010/025925, Apr. 27, 2010, 2 pages.

* cited by examiner

Primary Examiner — Dang Ton
Assistant Examiner — Lionel Preval
(74) Attorney, Agent, or Firm — Patent Law Works LLP

(57) ABSTRACT

A system and a method are disclosed for reducing interaction between a server and an endpoint while executing features on an endpoint. The endpoint, and not the application server, includes part or all of the implementation of UI logic and feature logic. The endpoint therefore does not have to rely on server's instructions for executing a feature. The endpoint also includes an endpoint determination module for determining the parts of the UI logic and feature logic implemented on the endpoint and the parts implemented on a switch or a server.

20 Claims, 11 Drawing Sheets

TELEPHONY SYSTEM WITH INTELLIGENT ENDPOINTS OR INTELLIGENT SWITCHES TO REDUCE DEPENDENCY OF ENDPOINTS ON APPLICATION SERVER

BACKGROUND OF THE INVENTION

1. Field of the Invention

The present invention generally relates to Voice over Internet Protocol (VoIP) telephony systems, and more specifically, to a telephony system with distributed user interface logic and feature logic.

2. Description of the Background Art

The prior art includes a variety of distributed telephony systems. Traditional switched network systems have given way to new telephony systems that use VoIP on packet-switched networks. These VoIP systems offer the same functionality as traditional switched system such as the ability to transfer calls, put calls on hold, automated attendant functions, hunt groups, etc.

Traditionally, the VoIP phones were driven by logic and data located on a server. For example, in response to each key press on the VoIP phone, the prior art server sends an updated representation of the display or a "no-op" message indicating that the phone's display do not need to change in response to the key press. The prior art server therefore is actively involved in every step of the execution of feature logic and UI logic on the phone. Because of the server's active involvement in execution of application features, a momentary network glitch disrupting the connection between the server and the phone is more likely to cause a noticeable interruption of service.

Additionally, in network configurations where the phones connect to the server through a switch, a network glitch between the server and the switch affects the connections of all the phones being served by the server through the switch.

Moreover, the server's active involvement in execution of application features consumes bandwidth between the server and the switch, and the bandwidth between the switch and the phones, when the messages are passed back and forth between the server and the phones through the switch. This consumption of bandwidth limits the number of phones that can be managed by a particular server or a switch. Also, the server's active involvement in the execution of the application introduces latency into the system; in some environments, users may notice the amount of time it takes to make a round trip to the server with each key press event.

SUMMARY OF THE INVENTION

The present invention comprises an endpoint, switch or a server with an intelligent telephony module. The intelligent telephony module determines the entity in the telephony system that performs part or most of the logic for a requested application feature and communicates with that entity to perform the requested application feature.

The intelligent telephony module comprises a determination module and a communication module. The determination module determines the entities that perform part or most the feature logic and user interface ("UI") logic. The determination module, through the communication module, communicates with the determined entities and requests the determined entities to perform the requested feature.

In one embodiment, the intelligent telephony module also comprises feature logic module that comprises part or most of the instructions for achieving the end result of a requested feature. In another embodiment, the intelligent telephony module also comprises a UI logic module that comprises part or most of the instructions for rendering data or other objects of an application on the endpoint.

In one embodiment, the feature logic modules present in multiple entities comprise complementary instructions for achieving the end result of the requested feature. For example, the feature logic module on an endpoint can work in tandem with a feature logic module on a switch or a server. Similarly, a feature logic module on a switch can work in tandem with a server or an endpoint. In another embodiment, the UI logic modules present in multiple entities comprise complementary instructions for rendering requested data or another object of the application on the endpoint. For example, the UI logic module on a server can work in tandem with a UI logic module on a switch or a server.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
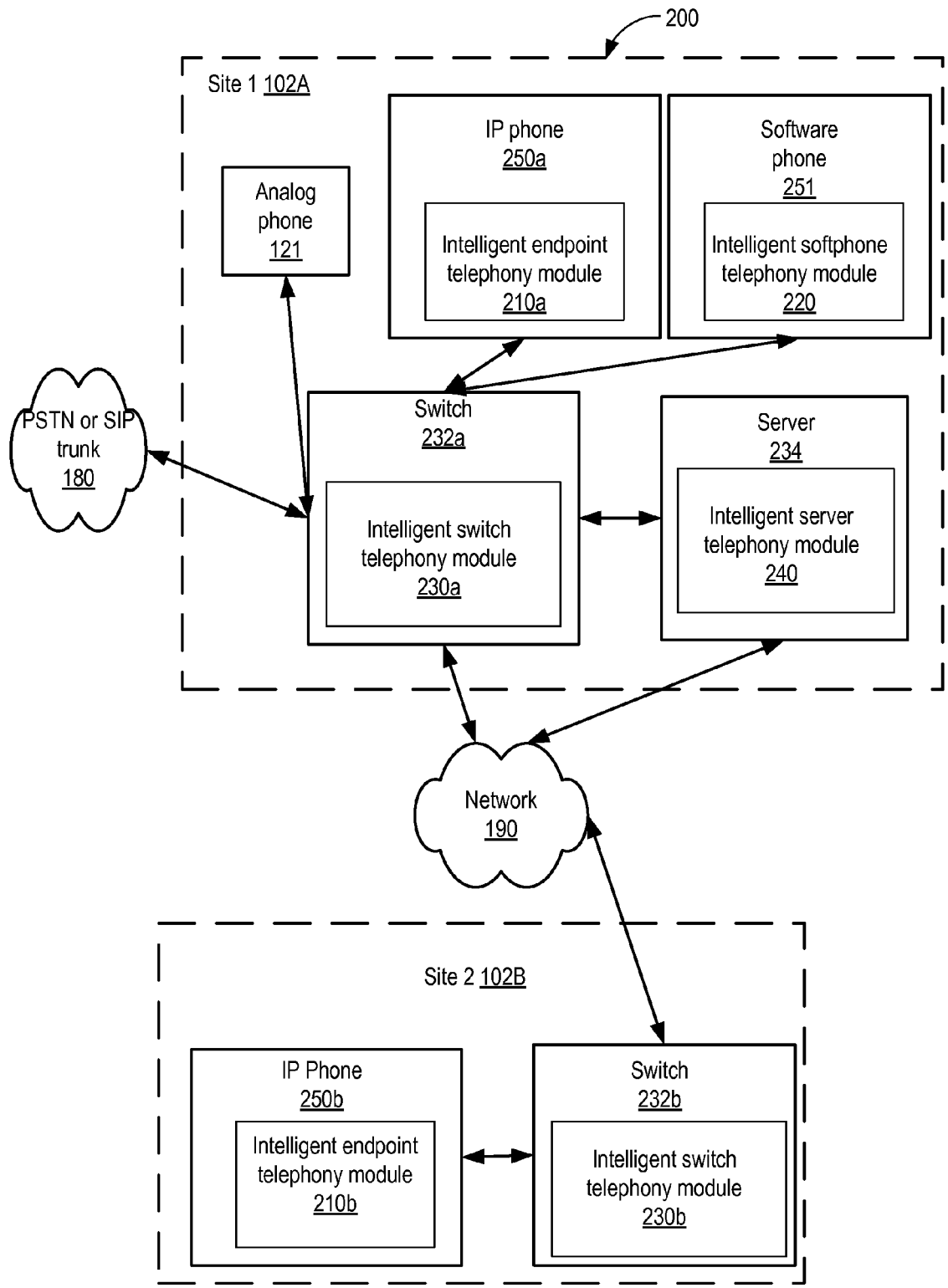
FIG. 1 illustrates a block diagram of a distributed telephony system according to a first embodiment of the invention.

A system and method for reducing interaction between a server and an endpoint while executing features on an endpoint is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a distributed telephony system 200 according to one embodiment of the invention. In this embodiment of the telephony system 200, unlike the prior art, the feature logic, the UI logic and the application data for telephony features and applications does not reside completely on server 234 in telephony system 200. In some embodiments, as described in FIG. 2A-2F, the UI logic, feature logic and application data for certain features reside partly on server 234, partly on switches 232*a-b* or partly on endpoints 250-251.

Endpoints 250-251 in these embodiments become less dependent on server 234 and therefore are less affected by network glitches between server 234 and endpoints 250-251 because endpoints 250-251 or switches 232*a-b* include part of feature logic or UI logic. Additionally, the reduced dependence of endpoints 250-251 on server 234 reduces bandwidth and processing consumption and allows server 234 and switches 232*a-b* to manage more endpoints than prior art server and prior art switches. Additionally, the reduced dependence of endpoints 250-251 on server 234 reduces sensitivity to network latency which improves performance of the endpoints 250-251 in the perception of the user.

The illustrated embodiment of telephony system 200 includes a first site 102A and a second site 102B communicatively coupled to each other through network 190. As used herein, a site represents a grouping of resources. One skilled in the art will note that sites 102A, 102B can be physically distinct from each other or merely topology-related groupings that are not in physically distinct locations. Additionally, the telephony system 200 architecture can be expanded to numerous sites and is not limited to only two sites.

The first site 102A includes a server 234, a switch 232a, and three endpoints (analog phone 121, IP phone 250a and software phone 251). The switch 232a represents a Voice over Internet Protocol (VoIP) device to which a number of endpoints can be coupled, such as analog phones 121, IP phones 250a and software phones (softphones) 251. Switch 232a includes intelligent switch telephony module 230a. The intelligent switch telephony module 232a comprises modules that enables switch 232a to reduce dependence of endpoint 250a, 251 on server 234. The intelligent module 232a is described in greater detail in FIG. 2A-2F.

Switch 232a is coupled to the network 190. The switch 232a is also coupled to the public switched telephone network (PSTN) trunk 180 via an analog or digital trunk line (e.g., a T1 or E1 interface) or a SIP trunk service provider. In the illustrated configuration, the switch 232a provides an interface for calls originating from or terminating on the PSTN or SIP trunk 180. Although only a single switch 232a is shown in FIG. 1, those skilled in the art will recognize that a particular site such as the first site 102A may include a plurality of switches.

An endpoint enables a user to carry on a phone call. Although in the illustrated embodiment the first site 102a has three endpoints (one analog phone 121, one IP phone 250a and one softphone 251), in other embodiments the first site 102A has different numbers and types of endpoints. Examples of endpoints include a video conferencing device, a multipoint control unit (MCU), a conference bridge, an analog terminal adapter (ATA), and any other device that originates and/or terminates a media stream. An endpoint is coupled to the switch 232a, server 234, or both. Each of the endpoints can also include a display device (not shown) that is used in conjunction with the phone of the endpoint.

In one embodiment, an endpoint has a user interface to send data to and receive data from a user. The analog phone 121 has, for example, a Telephone User Interface (TUI) that sends data through a speaker and receives data through a microphone and a keypad. The IP phone 250a has, for example, both a TUI and a graphical user interface (GUI) that sends data through a display device associated with the IP phone 250a. In one embodiment, the IP phone's graphical user interface also receives data from a touch screen display device associated with the IP phone 250a.

Additionally, the IP phone 250a comprises intelligent endpoint telephony module 210a. The intelligent endpoint telephony module 210a comprises modules that enables IP phone 250a to reduce its dependence on server 234. The intelligent endpoint telephony module 210a is described in greater detail in FIG. 2A-2F.

Softphone 251 has, for example, a software application running on a computer that emulates a phone and sends data through a display device and a speaker and receives data through a microphone, a keyboard and a pointing device. The softphone 251 comprises intelligent softphone telephony module 220 that enables softphone 251 to reduce its dependence on server 234. The intelligent softphone telephony module 220 is similar to intelligent endpoint telephony module 210a and described in greater detail in FIG. 2A-2F.

Server 234 is configured to implement features or functions of the telephony system 200 and applications made available to the end user. Server 234 is coupled to network 190 and although not shown can also be coupled to one or more endpoints, such as IP phone 250a and softphone 251. Server 234 includes a processor. The processor can be a conventional processing device, such as a general-purpose microprocessor. Server 234 also includes a memory. The memory includes program instructions or functional units that in one embodiment partly implement features of the telephony system and one or more applications. Specifically, the memory includes a telephony management software (TMS) unit and a telephony application programming interface (TAPI) unit.

An application unit uses the TAPI unit to exchange data with the TMS unit. The TMS unit is able to communicate with and manage one or more switches 130. For example, with reference to FIG. 1, the TMS unit included in the server 234 can manage switches 232a-b. Through the TAPI unit, the TMS unit presents an application with computer-telephony integration (CTI) view of these switches 232a-b. This allows the application to manage switches 232a-b. Such switches 232a-b operate in a degraded but nonetheless useful fashion without an associated TMS unit. Server 234 has a user interface to send data to and receive data from a user. The user interface interacts with TMS in order to allow a user with administrative rights to manage switches 232a-b and change the configuration settings of switches 232a-b. The user can access the user interface at the server or at an endpoint (e.g., soft phone).

Additionally, server 234 comprises intelligent server telephony module 240. The intelligent server telephony module 240 comprises modules that enable endpoints 250a-b, 251 to reduce their dependence on server 234. The intelligent server telephony module 240 is described in greater detail in FIG. 2A-2F.

One skilled in the art will appreciate that additional networking devices (not shown) can be added to the first site 102a, for example, if needed to support additional endpoints 250-251, servers 234, switches 232 or other systems. For example, the first site 102a can include a second switch 232b and an edge router to couple the first site 102a to the network 190 and to provide local area connectivity for the first and second switches 232a-b. One skilled in the art will also recognize that numerous configurations of switches 232 and communications links are contemplated. For example, PSTN links can be coupled to multiple switches 232 at several points within the topology and soft-switches can also be used.

The second site 102b similarly includes an endpoint (IP phone 250b) and a switch 232b. The configuration of the second site 102b demonstrates that a server is not required for each site. Switch 232b of the second site 102b can be managed by server 234 that is illustrated in the first site 102a. A call can involve more than one switch. For example, a call that originates from the PSTN or SIP trunk 180 and terminates on an endpoint that is communicatively coupled to switch 232b of the second site 102b involves two switches: switch 232a of the first site 102a and switch 232b of the second site 102b. In addition, each switch 232a, 232b can be managed by a different server 234.

In one embodiment, the network 190 is a partially public or a wholly public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment, the network 190 is an IP-based wide or metropolitan area network.

Configuration with Most or all of Feature Logic and UI Logic Located at Endpoint The description below of embodiments in FIG. 2A-2F describes one or more entities that individually or collectively implement the feature logic and UI logic for application features. The embodiments are described mostly with reference to application feature of displaying contact list. One of ordinary skill in the art will understand that contact list is one example of many application features like retrieving email when a user accesses her inbox, initializing a personal greeter, retrieving voicemail messages, replying to voicemail messages, managing voicemail messages, viewing user account configuration settings, modifying user account configuration settings, viewing call history etc.

Figure 2A:
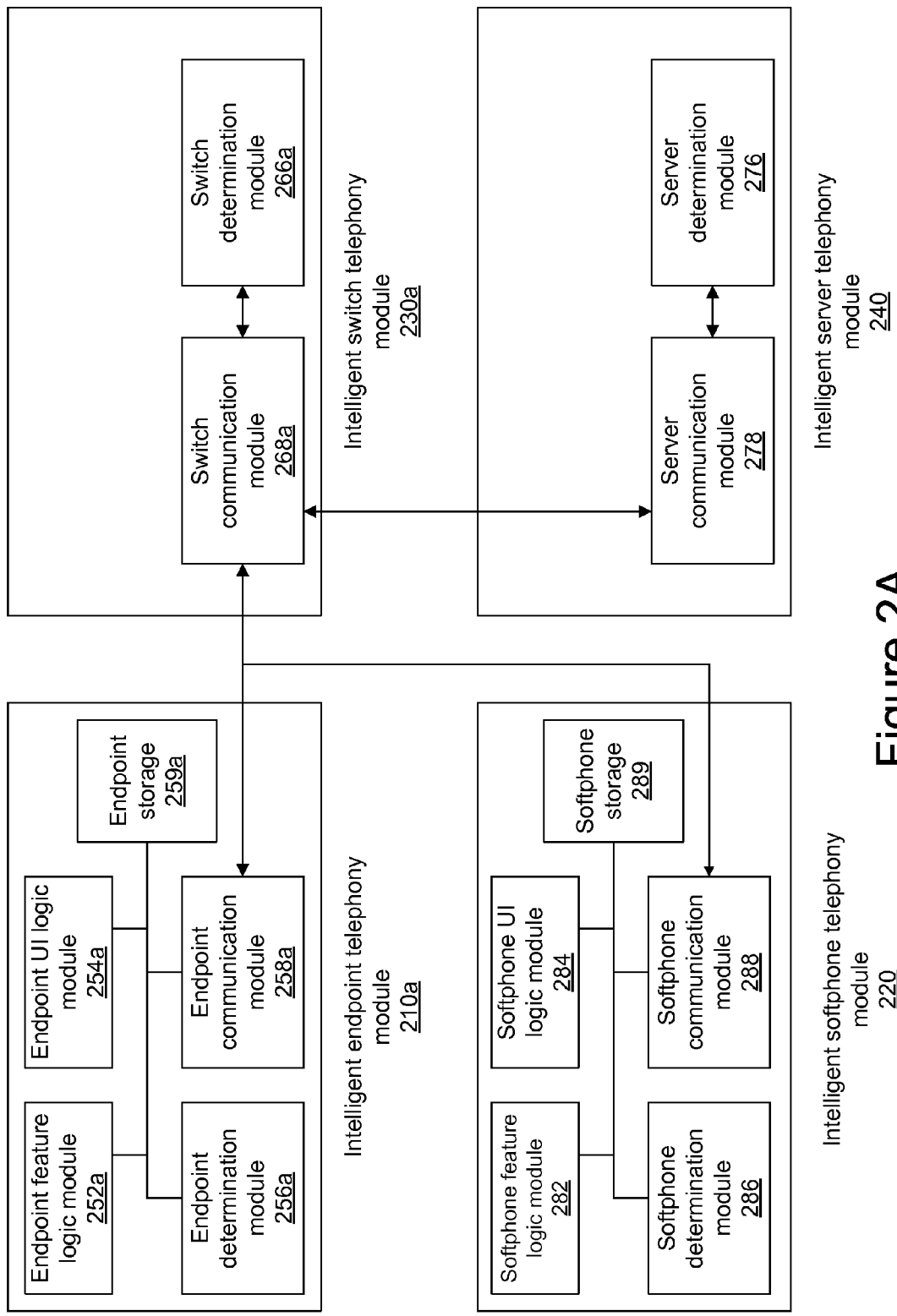
FIG. 2A illustrates a first configuration of intelligent endpoint telephony module, intelligent softphone telephony module, intelligent switch telephony module and intelligent server telephony module according to an embodiment of the invention.

FIG. 2A illustrates a first configuration of intelligent endpoint telephony module 210a, intelligent softphone telephony module 220, intelligent switch telephony module 230a and intelligent server telephony module 240a according to an embodiment of the invention.

Intelligent endpoint telephony module 210a comprises endpoint feature logic module 252a, endpoint UI logic module 254a, endpoint determination module 256a, endpoint communication module 258a and endpoint storage 259a. All these modules are communicatively coupled to each other through a communication bus. The communication bus is any kind of bus capable of transmitting data between the entities connected to the bus. The endpoint communication module 258a is also communicatively coupled to switch communication module 268a in intelligent switch telephony module 230a. In one embodiment, the endpoint communication module 258a is also communicatively coupled to server communication module 278 in intelligent server telephony module 240.

The endpoint feature logic module 252a is a hardware, firmware, software or a blended implementation that performs the functionality of at least one application feature like retrieving a contact list when a user requests her contact list, retrieving email when a user accesses her inbox, initializing a personal greeter, retrieving voicemail messages etc. In this embodiment, the endpoint feature logic module 210a comprises the instructions for performing the requested feature without waiting for instructions from server 234 or switch 232a.

Endpoint UI logic module 254a is a hardware, firmware, software or a blended implementation that performs the functionality of providing user interface to a user. For example, the UI logic module 254a can comprise instructions for displaying a menu on display screen of IP phone 250a. In one embodiment, UI logic module 254a can also comprise instructions for displaying the dialed number or requested user contacts. In another embodiment, UI logic module 254a can also comprise instructions for playing an audio message requesting the user for an appropriate input or providing user with requested audio information.

The endpoint determination module 256a is a hardware, firmware, software or a blended implementation that determines the entities in telephony system 200 that individually or collectively implement various telephony and application features. This determination can be made in a number of ways. In one embodiment, the endpoint determination module 256a reads a configuration file placed in endpoint storage 259a or other storage accessible to endpoint 250a. The configuration file includes the information about features supported by endpoints, switches, and servers. The configuration file can also include information about features that are partly supported by endpoint, partly supported by switches, or partly supported by servers. In one embodiment, the configuration file also includes information regarding what part of the implementation is supported by a particular entity. In one embodiment, the above mentioned information is stored in another format on endpoint storage 259a. In another embodiment, the above mentioned information is hardcoded into endpoint 250a. In yet another embodiment, endpoint 250a attains this information from switches 232a-b and/or server 234 through a description protocol like Session Description Protocol or through a repeated update message sent by server 234 or switches 232a-b.

The endpoint communication module 258a is a hardware, firmware, software or a blended implementation that communicates with other entities in telephony system 200. For example, the endpoint communication module 258a informs the determined entities about the user's input, exchanges other data, or receives instructions to take appropriate action in response to the user input.

The endpoint storage 259a is volatile and/or non-volatile storage that comprises data used by various user applications and telephony features. For example storage 259a can store a user's contacts, emails, voicemail, preferences and phone configurations for various users.

The intelligent softphone telephony module 220 comprises softphone feature logic module 282, softphone UI logic module 284, softphone determination module 286, softphone communication module 288 and softphone storage 289. All these modules are communicatively coupled to each other through a communication bus. The communication bus is any kind of bus capable of transmitting data between the entities connected to the bus. The softphone communication module 288 is also communicatively coupled to switch communication module 268a in intelligent switch telephony module 230a. In one embodiment, the softphone communication module 288 is also communicatively coupled to server communication module 278 in intelligent server telephony module 240.

The modules in intelligent softphone telephony module 220 have similar functionality as corresponding modules in intelligent endpoint telephony module 210a. The softphone modules, however, may have a different implementation as these modules reside in a software phone running on a computer whereas the modules in intelligent endpoint telephony module 210a reside on hardware that is tailor-made for endpoint functionality.

The intelligent switch telephony module 230a comprises of switch communication module 268a and switch determination module 266a. The switch communication module 268a is communicatively coupled to switch determination module 266a, endpoint communication module 258a, softphone communication module 288 and server communication module 278.

The switch determination module 266a is a hardware, firmware, software or a blended implementation that determines the entities in telephony system 200 that individually or collectively implement various telephony and application features. This determination can be made in a number of ways. In one embodiment, the switch determination module 266a reads a configuration file placed in storage accessible to switch determination module 266a. The configuration file includes the information about features supported by endpoints, switches, and servers. The configuration file can also include information about features that are partly supported by endpoint, partly supported by switches, or partly supported by servers. In one embodiment, the configuration file also includes information regarding what part of the implementation is supported by a particular entity. In one embodiment, the above mentioned information is stored in another format in storage on switch 232a. In another embodiment, the above mentioned information is hardcoded into switch 232a. In yet another embodiment, switch 232a attains this information from endpoints 250a, 251 and/or server 234 through a description protocol like Session Description Protocol or through a repeated update message sent by server 234 or endpoints 250a, 251.

The switch communication module 268a is a hardware, firmware, software or a blended implementation that communicates with other entities in telephony system 200. For example, the switch communication module 268a informs the determined entities about the user's input, exchanges other data, or receives instructions to take appropriate action in response to the user input.

The intelligent server telephony module 240 comprises of server communication module 278 and server determination module 276. The server communication module 278 is communicatively coupled to server determination module 276 and switch communication module 268a. In one embodiment, the server communication module 278 is also communicatively coupled to endpoint communication module 258a and softphone communication module 288.

The server determination module 276 is a hardware, firmware, software or a blended implementation that determines the entities in telephony system 200 that individually or collectively implement various telephony and application features. This determination can be made in a number of ways. In one embodiment, the server determination module 276 reads a configuration file placed in storage accessible to server determination module 276. The configuration file includes the information about features supported by endpoints, switches, and servers. The configuration file can also include information about features that are partly supported by endpoint, partly supported by switches, or partly supported by servers. In one embodiment, the configuration file also includes information regarding what part of the implementation is supported by a particular entity. In one embodiment, the above mentioned information is stored in another format in storage on server 234. In another embodiment, the above mentioned information is hardcoded into server 234. In yet another embodiment, server 234 attains this information from endpoints 250a, 251 and/or switches 232a-b through a description protocol like Session Description Protocol or through a repeated update message sent by switches 232a-b or endpoints 250a, 251.

The server communication module 278 is a hardware, firmware, software or a blended implementation that communicates with other entities in telephony system 200. For example, the server communication module 278 informs the determined entities about the user's input, exchanges other data, or receives instructions to take appropriate action in response to the user input.

FIG. 2A displays a configuration where endpoints 250a, 251 have most or all of the feature logic and UI logic for certain telephony and application features. Accordingly, endpoints 250a, 251 do not wait for instructions from switch 232a and server 234 for performing these features in response to user input. Switch 232a and server 234 has determination modules 266a, 276 that determine the entities that have the feature logic and UI logic for a particular feature. Switch 232a and server 234 therefore do not get involved in performing features that are present on endpoints 250a, 251 while switch 232a and server 234 can perform parts of other features as described in configurations below.

Figure 2B:
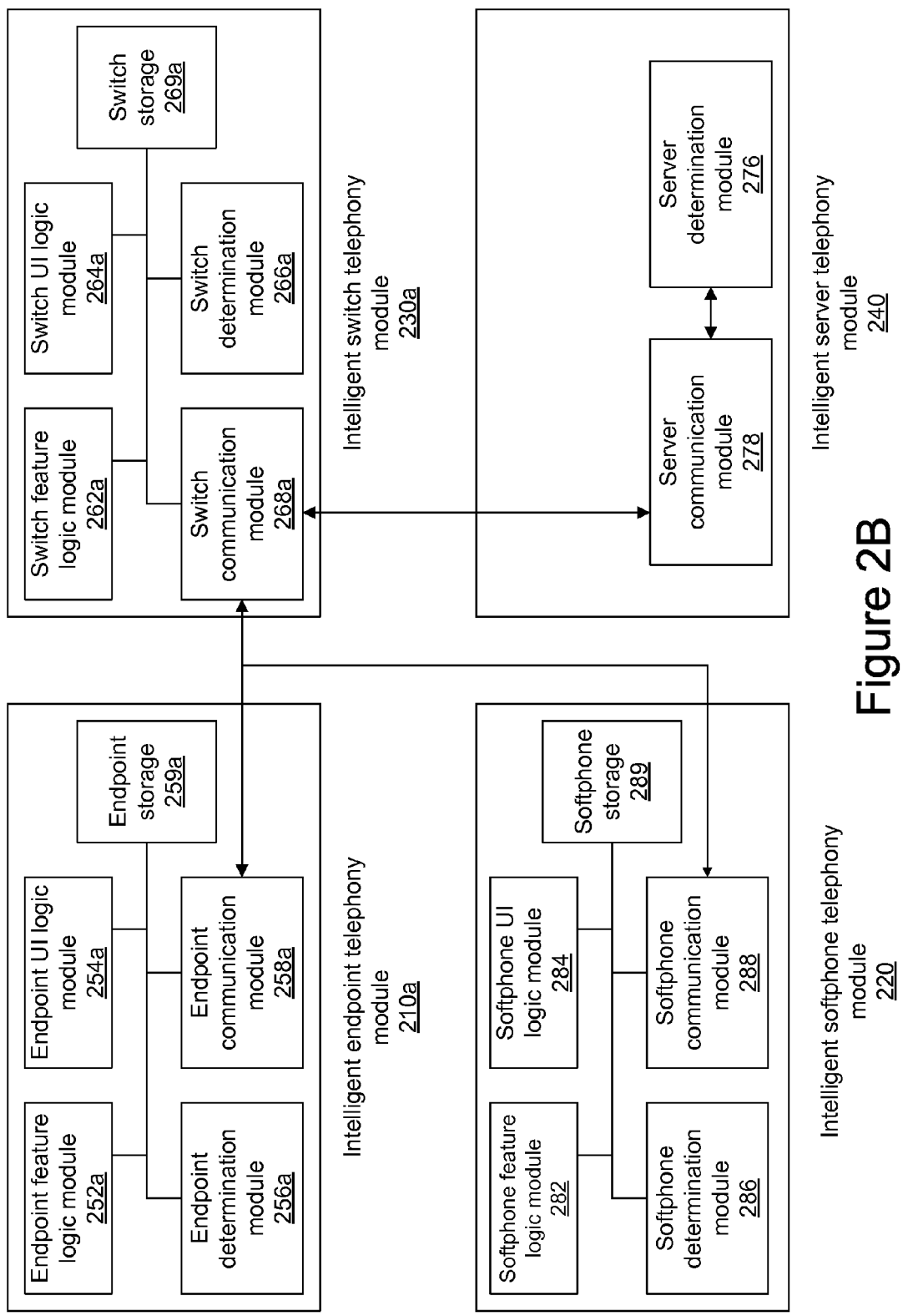
FIG. 2B illustrates a second configuration of intelligent endpoint telephony module, intelligent softphone telephony module, intelligent switch telephony module and intelligent server telephony module according to an embodiment of the invention.

Configuration with Feature Logic and UI Logic Located Partly at Endpoint and Partly at Switch FIG. 2B illustrates a second configuration of intelligent endpoint telephony module 210a, intelligent softphone telephony module 220, intelligent switch telephony module 230a and intelligent server telephony module 240a according to an embodiment of the invention.

In this embodiment, the intelligent endpoint telephony module 210a has similar modules as described in FIG. 2A. Moreover, the endpoint determination module 256a, endpoint communication module 258a and endpoint storage 259a have the same structure and functionality as described above.

The endpoint feature logic module 252a is a hardware, firmware, software or a blended implementation that performs part of the functionality of at least one application feature like retrieving a contact list when a user requests her contact list, retrieving email when a user accesses her inbox, initializing a personal greeter, retrieving voicemail messages etc. The endpoint feature logic module 252a in this embodiment works in tandem with switch feature logic module 262a to perform a requested telephony or application feature.

For example, the endpoint feature logic module 252a can have instructions for retrieving the first ten contacts for a user from endpoint storage 259a. In the meantime, the endpoint feature logic module 252a requests the rest of user's contacts from switch 232a. The endpoint feature logic module therefore does not have the instructions to retrieve all of the user's contact and the endpoint feature logic module 252a works in tandem with switch feature logic module 262a to retrieve all of user's contacts.

In another example, the endpoint feature logic module 252a can have instructions for retrieving the ten most recent call history entries from endpoint storage 259a. Call history entries comprise information about incoming and outgoing calls like dialed number or number of the caller who called the endpoint 250-251, an owner name associated with the number, time the call was initiated, duration of the call etc. The endpoint feature logic module 252a, in this example, retrieves the first ten call history entries and then requests the rest of the call history entries from switch 232a. The endpoint feature logic module 252a also has instructions for retrieving the requested call history entries from switch 232a when the endpoint has the ten most recent call history entries but the user has requested the call history entries sorted by the caller's name. Such entries would be present on switch 232a but endpoint 250-251 may not have the first ten entries sorted by caller's name.

Endpoint UI logic module 254a is a hardware, firmware, software or a blended implementation that performs part of the functionality of providing user interface to a user. For example, the UI logic module 254a can comprise instructions for displaying the dialed digits on endpoint 250a. The UI logic module, however, waits for instructions from switch UI logic module 264a for displaying a name and additional information corresponding to the dialed number.

Again, the modules in intelligent softphone telephony module 220 have similar functionality as corresponding modules in intelligent endpoint telephony module 210a. The softphone modules, however, may have a different implementation as these modules reside in a software phone running on a computer whereas the modules in intelligent endpoint telephony module 210a reside on hardware that is tailor-made for endpoint functionality.

The intelligent switch telephony module 230a comprises switch feature logic module 262a, switch UI logic module 264a, switch communication module 268a, switch determination module 266a and switch storage 269a. All these modules are communicatively coupled to each other through a communication bus. The communication bus is any kind of bus capable of transmitting data between the entities connected to the bus. The switch communication module 268a is also communicatively coupled to endpoint communication module 258a in intelligent endpoint telephony module 210a, softphone communication module 288 in intelligent softphone telephony module 220 and server communication module 278 in intelligent server telephony module 240. The structure and functionality of switch communication module 262a and switch determination module 266a are the same as described above.

Switch feature logic module 262a is a hardware, firmware, software or a blended implementation that performs part of the functionality of at least one application feature like retrieving a contact list when a user requests her contact list, retrieving email when a user accesses her inbox, initializing a personal greeter, retrieving voicemail messages, replying to voicemail messages, managing voicemail messages, viewing configuration settings, modifying configuration settings, etc. In this embodiment, the switch feature logic module 262a comprises instructions for performing the requested feature in tandem with intelligent endpoint telephony module 210a.

For example, endpoint 250a can have limited storage that can only store up to ten contacts or ten voicemail messages for a user and the rest of the contacts or voicemail messages are stored on switch 232a. Accordingly, the endpoint intelligent telephony module 210a can have instructions for retrieving the first ten contacts or the first ten voice messages for a user and switch feature logic module 262a can have instructions for retrieving rest of the contacts or voicemail messages for a user.

Switch UI logic module 264a is a hardware, firmware, software or a blended implementation that performs part of the functionality of providing user interface to a user. For example, the endpoint UI logic module 254a can comprise instructions for displaying a dialed phone number and the switch UI module 264a can have instructions for displaying an entity's name and email address next to the displayed phone number. In one embodiment, the switch UI logic module 264a can also determine whether the dialed entity has authorized the system to display the entity's email address and name with the dialed phone number.

The switch storage 269a is volatile and/or non-volatile storage that comprises data used by various user applications and telephony features performed by the switch. For example storage 269a can store a user's contacts, dial tone and various other tones played on the phone and phone configurations for various user.

The intelligent server telephony module 240 has been described above.

FIG. 2B therefore displays a configuration where endpoints 250a, 251 and switch 232a have complimentary parts of the feature logic and UI logic for certain telephony and application features. Accordingly, the endpoints 250a, 251 do not wait for instructions from server 234 for performing these features in response to user input. Consequently, any network glitches between the server 234 and switch 232a do not affect the execution of a requested feature on endpoints 250a, 251.

Figure 2C:
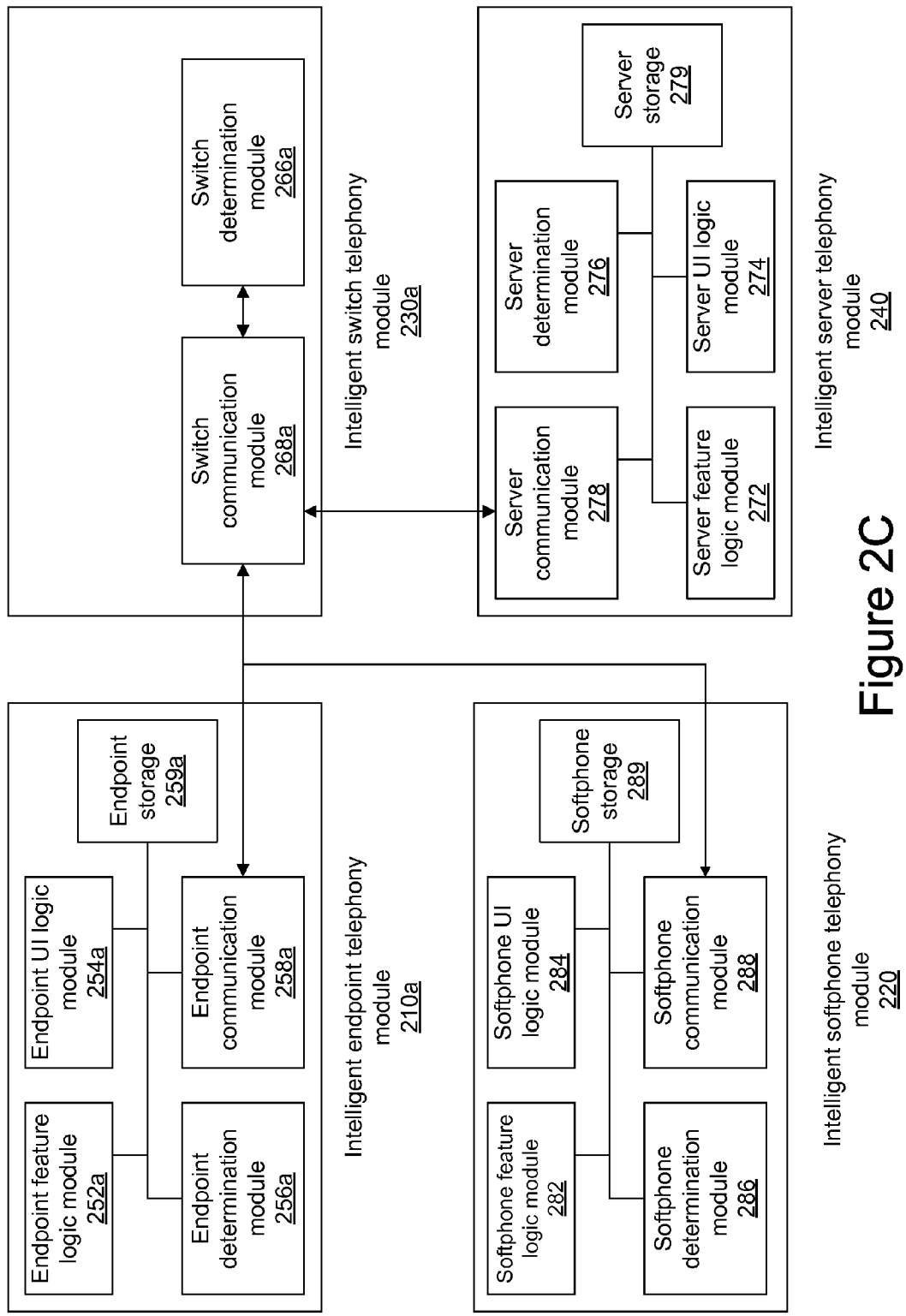
FIG. 2C illustrates a third configuration of intelligent endpoint telephony module, intelligent softphone telephony module, intelligent switch telephony module and intelligent server telephony module according to an embodiment of the invention.

Configuration with Feature Logic and UI Logic Located Partly at Endpoint and Partly at Server FIG. 2C illustrates a third configuration of intelligent endpoint telephony module 210a, intelligent softphone telephony module 220, intelligent switch telephony module 230a and intelligent server telephony module 240a according to an embodiment of the invention.

In this embodiment, the intelligent endpoint telephony module 210a has same modules with same structure and functionality as described in FIG. 2B except that the endpoint feature logic module 252a and endpoint UI logic module 254a work in tandem with server feature logic module 272 and server UI logic module 274, instead of switch feature logic module 262a and switch UI logic module 264a, to perform a requested telephony or application feature.

The intelligent switch telephony module 230a comprises switch communication module 268a and switch determination module 266a. These modules have the same structure and functionality as described above.

Intelligent server telephony module 240 comprises server feature logic module 272, server UI logic module 274, server determination module 276, server communication module 278 and server storage 279. All these modules are communicatively coupled to each other through a communication bus. The communication bus is any kind of bus capable of transmitting data between the entities connected to the bus. The server communication module 278 is also communicatively coupled to switch communication module 268a in intelligent switch telephony module 230a. In one embodiment, the server communication module 278 is also communicatively coupled to endpoint communication module 258a and softphone communication module 288. The structure and functionality of server communication module 272 and server determination module 276 are described above.

Server feature logic module 272 is a hardware, firmware, software or a blended implementation that performs part of the functionality of at least one application feature like retrieving a contact list when a user requests her contact list, retrieving email when a user accesses her inbox, initializing a personal greeter, retrieving voicemail messages etc. In this embodiment, the server feature logic module 272 comprises instructions for performing the requested feature in tandem with intelligent endpoint telephony module 210a.

For example, the endpoint intelligent telephony module 210a can have instructions for retrieving the first ten contacts for a user and server feature logic module 272 can have instructions for retrieving rest of the contacts for a user.

In another example, the endpoint intelligent telephony module 210a can have instructions for retrieving a first block of user account configuration data and server feature logic module 272 can have instructions for retrieving the rest of the user configuration data. User configuration data includes information about a user's account like a forwarding phone number where the phone calls can be forwarded if the user does not attend the call on endpoints 250-251, phone rings that should be played when the endpoints 250-251 receive a call from a particular number, feature functions associated with shortcut buttons like changing the forwarding number when user selects a particular key on endpoints 250-251.

Server UI logic module 274 is a hardware, firmware, software or a blended implementation that performs part of the functionality of providing user interface to a user. For example, the endpoint UI logic module 254a can comprise instructions for displaying a dialed phone number and the server UI module 274 can have instructions for displaying an entity's name and email address next to the displayed phone number. In one embodiment, the server UI logic module 274 can also determine whether the dialed entity has authorized the system to display the entity's email address and name with the dialed phone number.

The server storage 279 is volatile and/or non-volatile storage that comprises data used by various user applications and telephony features performed by the server. For example storage 279 can store a user's contacts and phone configurations for various users.

FIG. 2C therefore displays a configuration where endpoints 250a, 251 and server 234 have complimentary parts of the feature logic and UI logic for certain telephony and application features. Accordingly, the endpoints 250a, 251 do not wait for instructions from server 234 for performing parts of the features in response to user input. Consequently, any network glitches between the server 234 and switch 232a do not affect the execution of at least part of the feature.

Figure 2D:
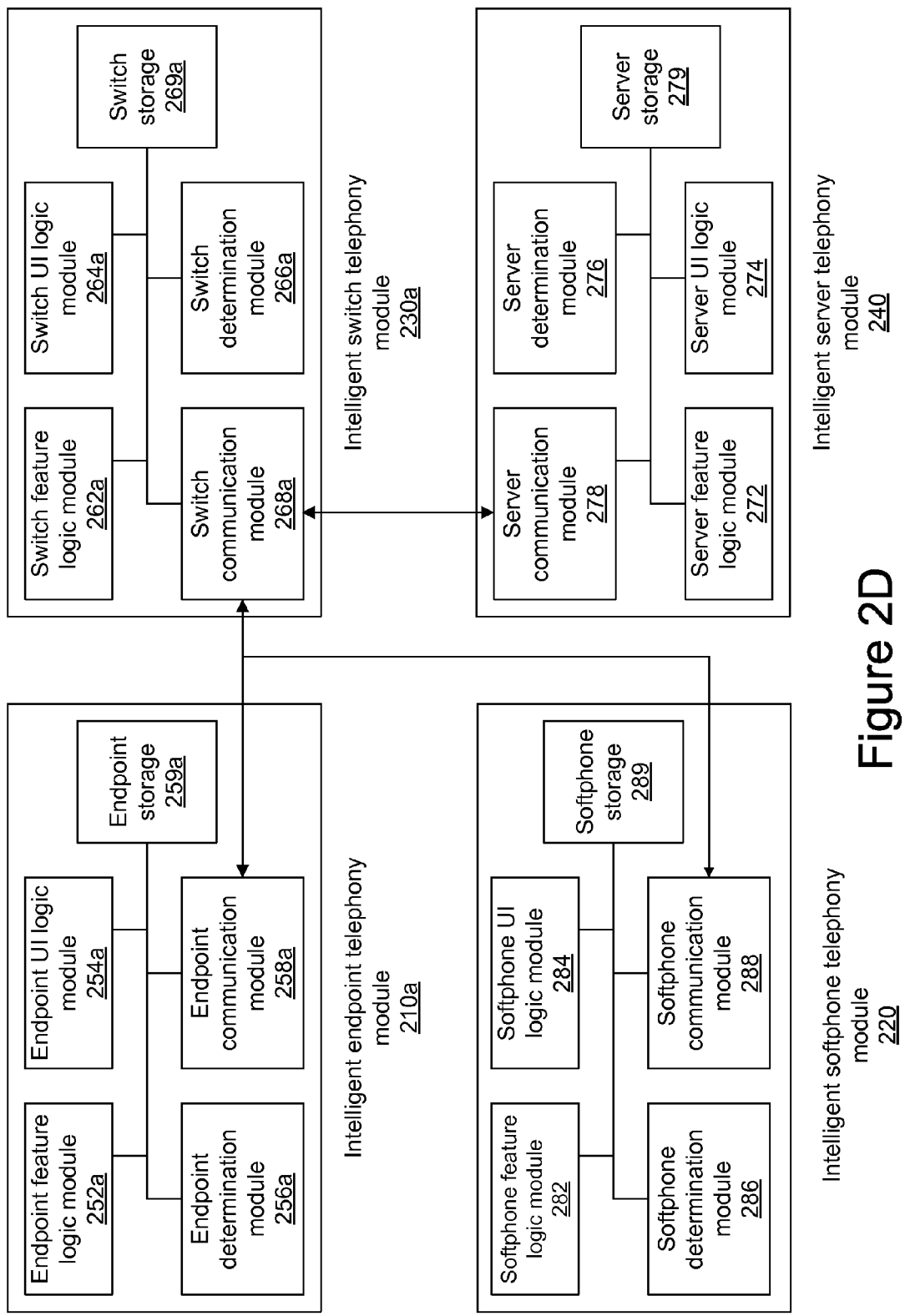
FIG. 2D illustrates a fourth configuration of intelligent endpoint telephony module, intelligent softphone telephony module, intelligent switch telephony module and intelligent server telephony module according to an embodiment of the invention.

Configuration with Feature Logic and UI Logic Located Partly at Endpoint, Partly at Switch and Partly at Server FIG. 2D illustrates a fourth configuration of intelligent endpoint telephony module 210a, intelligent softphone telephony module 220, intelligent switch telephony module 230a and intelligent server telephony module 240a according to an embodiment of the invention.

In this embodiment, the intelligent endpoint telephony module 210a has the same module as described above. Intelligent switch telephony module 230a has the same modules as described above in reference to FIG. 2B. Intelligent server telephony module 240 has the same modules as described above in reference to FIG. 2C. The determination modules 256a, 266a, 276, 286 and communication modules 258a, 268a, 278, 288 in the intelligent telephony modules 210a, 230a, 220, 240 have similar structure and functionality as described above.

The feature logic modules 252a, 262a, 272, 282 have similar structure and functionality except that endpoint feature logic module 252a, switch feature logic module 262a and server feature logic module 272 work in tandem to perform a requested application or telephony feature.

For example, endpoint 250a can have limited storage that can only store up to ten contacts for a user, switch 232a can have limited storage that can only store up to a hundred contacts and the rest of the contacts for the user are stored on server 234. Even though server 234 has adequate storage to store all the contacts for a user, it is advantageous to store the contacts closer to the user on endpoint 250a and switch 232a. This storage configuration reduces the affect of network glitches between server 234 and switch 232a as explained above.

Accordingly, the endpoint feature logic module 252a can have instructions for retrieving the first ten contacts for a user, the switch feature logic module 262a can have instructions for retrieving the next hundred contacts for the user, and the server feature logic module 272 can have instructions for retrieving the rest of the contacts for the user. The three feature logic modules 252a, 262a, 272 therefore work in tandem to retrieve all of the contacts for the user. The endpoint feature logic module 252a can retrieve the first ten contacts and request the rest from the switch feature logic module 266a. The switch feature logic module 262a can retrieve the next hundred and request the rest of contacts from server feature logic module 272. The server feature logic module can then retrieve the rest of the contacts for the user.

Similarly, the UI logic modules 254a, 264a, 274, 284 have similar structure and functionality as described above except that endpoint UI logic module 254a, switch UI logic module 264a and server UI logic module 274 work in tandem to perform a UI feature.

For example, endpoint 250a can have limited storage to store up to ten contacts or ten voicemail messages in endpoint storage 259a, switch 232a can store up to hundred contacts or hundred voicemail messages, and server 234 can store the rest of the contacts or voicemail messages. When the user requests all her contacts or all her voicemail messages, the endpoint UI logic module 254a instructs the endpoint 250a to display the ten contacts or play the first ten voicemail messages on endpoint 250a and wait for switch UI logic module 264a to update endpoint storage 259a with the next ten contacts or voicemail messages. Switch UI logic module 264a fetches the hundred contacts or hundred most recent voicemail messages from switch storage 269a, updates endpoint storage 259a with next ten contacts or next ten voicemail messages at a time and instructs endpoint UI logic module 254a to display the updated ten contacts or play the updated voicemail messages. After fetching the hundred contacts or hundred voicemail messages, switch UI logic module 264a waits for server UI logic module 274 to fetch the next hundred contacts or voicemail messages and update switch storage 269a with the next hundred contacts or next hundred voicemail messages. This process continues until endpoint UI logic module 254a has displayed all the user contacts or played all the voicemail messages.

FIG. 2D therefore displays a configuration where endpoints 250a, 251, switch 232a and server 234 have complimentary parts of the feature logic and UI logic for certain telephony and application features. Accordingly, the endpoints 250a, 251 do not wait for instructions from server 234 for performing parts of the feature execution controlled by intelligent endpoint telephony module 210a and intelligent switch telephony module 230a. Consequently, any network glitches between the server 234 and switch 232a do not affect the execution of at least those parts of the feature.

Configuration with Most of all of Feature Logic and UI Logic Located at Switch

Figure 2E:
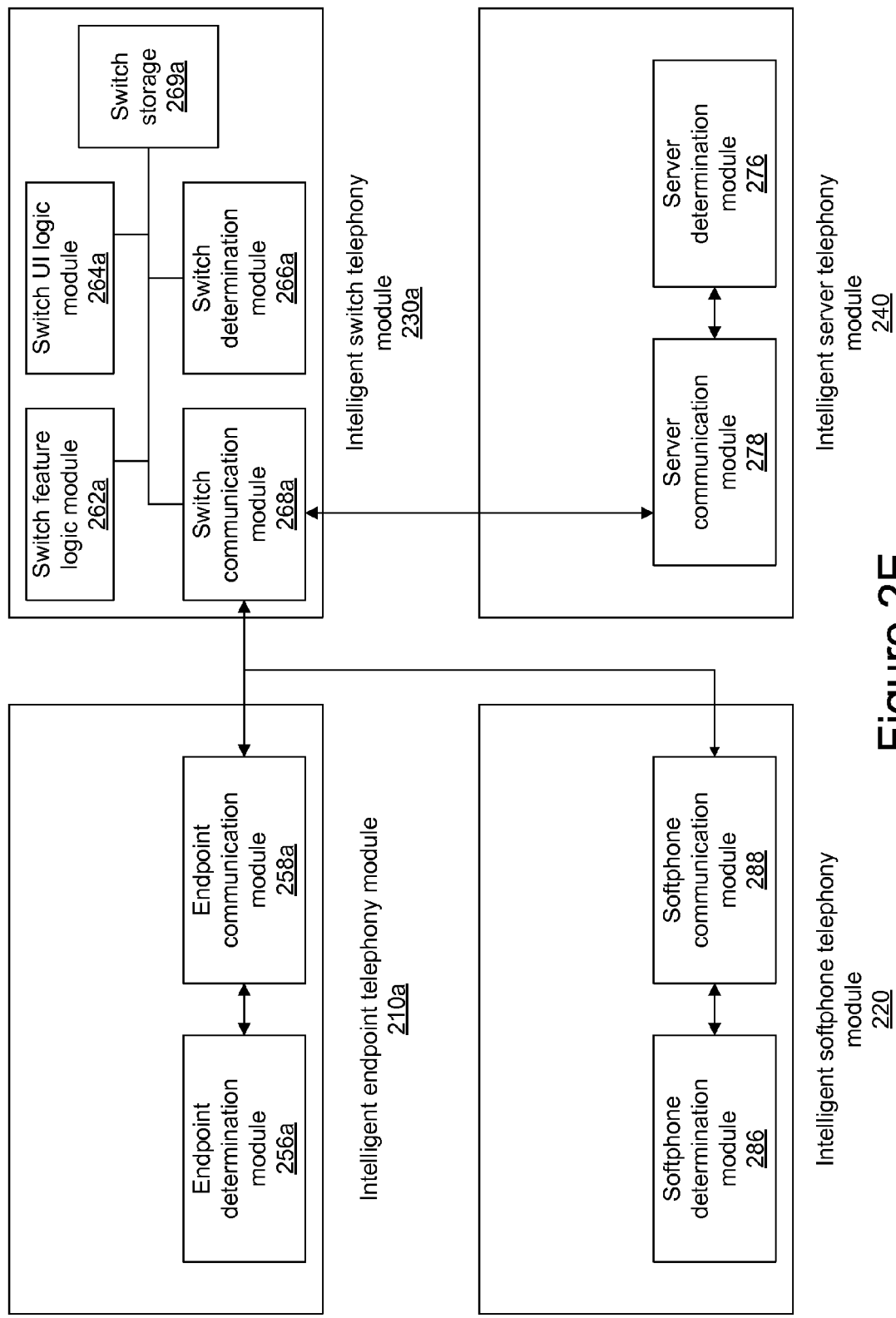
FIG. 2E illustrates a fifth configuration of intelligent endpoint telephony module, intelligent softphone telephony module, intelligent switch telephony module and intelligent server telephony module according to an embodiment of the invention.

FIG. 2E illustrates a fifth configuration of intelligent endpoint telephony module 210a, intelligent softphone telephony module 220, intelligent switch telephony module 230a and intelligent server telephony module 240a according to an embodiment of the invention.

In this embodiment, the intelligent telephony modules 210a, 230a, 220, 240 include their respective determination modules 256, 266a, 286, 276 and communication modules 258, 268a, 288, 278. These modules have been described above.

The intelligent switch telephony module 230a also comprise switch feature logic module 262a and switch UI logic module 262a. These modules have been described above as well. In this embodiment, however, these modules have all or most of the logic for performing an application or a telephony feature.

For example, in response to a user request for her contacts, the endpoint determination module 256a determines that the feature is performed by switch 232a and forwards a request to switch communication module 268a through endpoint communication module 258a. The endpoint communication module 258a forwards the request to switch feature logic module 262a and the switch feature logic module 262a retrieves all of the requested contacts from switch storage 269a or some other storage accessible to switch feature logic module 262a. The switch feature logic module 262a then transmits the retrieved contacts to endpoint 250a.

The switch UI logic module 264a then directs the endpoint 250a to display the contacts in a particular manner.

In another example, in response to a user's request for updating the user account configuration data, the endpoint determination module 256a determines that the feature is performed by switch 232a, and endpoint communication module 268a forwards the request to switch feature logic module 262a. The switch UI logic module 264a then directs the endpoint 250a to display the configuration data and transmit back any updates, and switch feature logic module 262a applies the received updates to the user's account configuration data.

FIG. 2E therefore displays a configuration where switch 232a have all or most of the feature logic and UI logic for certain telephony and application features. Accordingly, the endpoints 250a, 251 do not wait for instructions from server 234 for performing the feature. Consequently, any network glitches between the server 234 and switch 232a do not affect the execution of the feature.

Figure 2F:
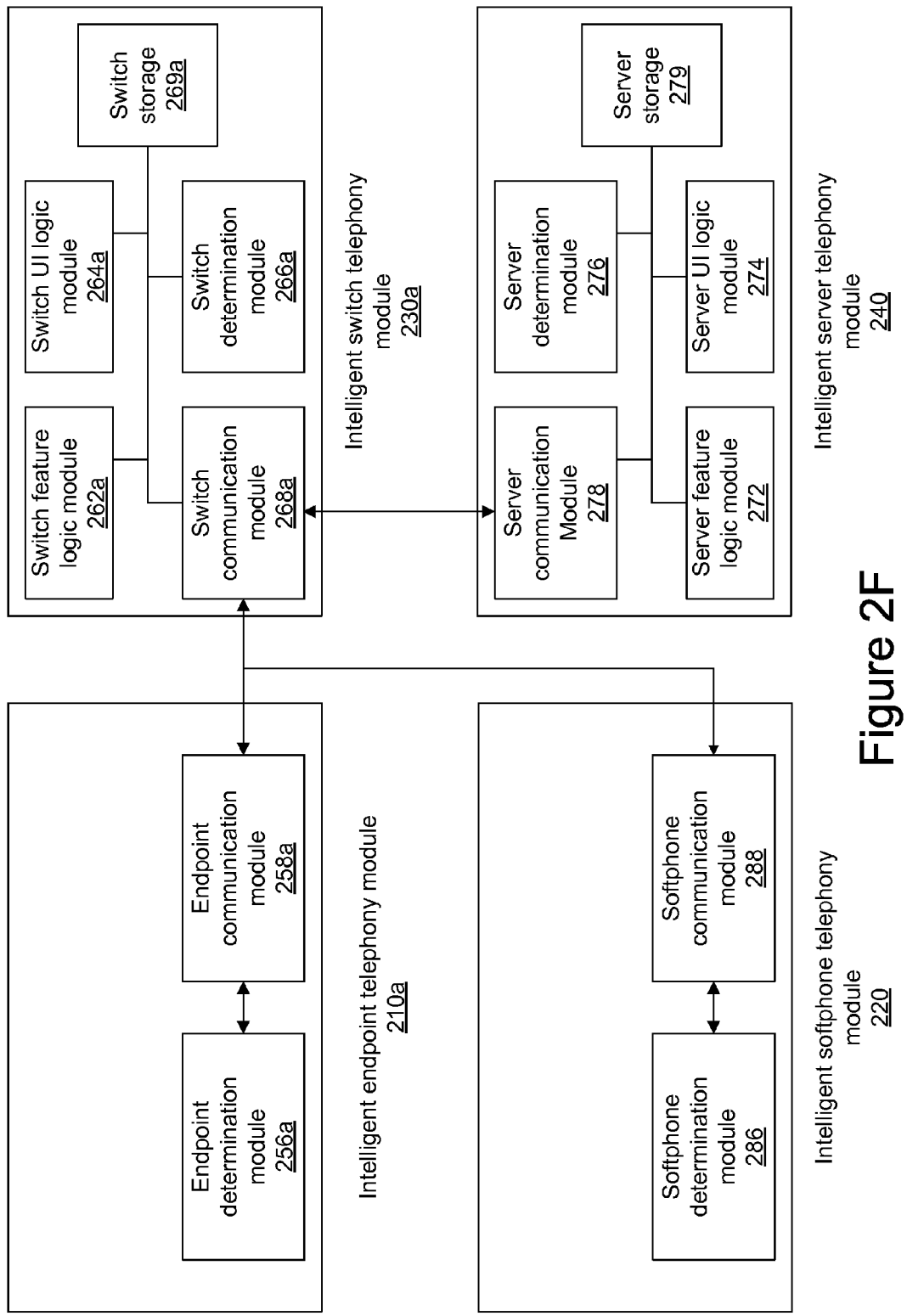
FIG. 2F illustrates a sixth configuration of intelligent endpoint telephony module, intelligent softphone telephony module, intelligent switch telephony module and intelligent server telephony module according to an embodiment of the invention

Configuration with Feature Logic and UI Logic Located Partly at Switch and Partly at Server FIG. 2F illustrates a sixth configuration of intelligent endpoint telephony module 210a, intelligent softphone telephony module 220, intelligent switch telephony module 230a and intelligent server telephony module 240a according to an embodiment of the invention.

In this embodiment, the intelligent telephony modules 210a, 230a, 220, 240 include their respective determination modules 256, 266a, 286, 276 and communication modules 258, 268a, 288, 278. These modules have been described above.

The intelligent switch telephony module 230a and intelligent server telephony module 240 also include their respective feature logic modules 262a, 272 and UI logic modules 264a, 274. These modules have similar structure and similar functionality as described in FIG. 2D except feature logic modules 262a, 272 work in tandem with each other and not with a feature logic module 252a in intelligent endpoint telephony module 210a. Similarly, the UI logic modules 264a, 274 work in tandem with each other but not with a UI logic module 252a in intelligent endpoint telephony module 210a.

For example, in response to a user request for her contacts, the endpoint determination module 256 determines that the feature is performed by switch 232a and server 234. The determination module 256 forwards the request to switch communication module 258 through endpoint communication module 268a. The endpoint communication module 268a forwards the request to switch determination module 266a. The switch determination module 266a determines that switch feature logic module can retrieve the first hundred contacts and forwards the request for first hundred contacts to switch feature logic module 262a. The switch determination module 266a also determines that the request for rest of the contacts can be handled by server 234 and forwards a request to server communication module 278 through switch communication module 268a. Server communication module 278 forwards the request to server determination module 276 which determines that server feature logic module 272 can handle the request. Server determination module 276 forwards the request to server feature logic module 272 and server feature logic module 272 retrieves the requested contacts and transmits the contacts to endpoint 250a directly or through switch 232a.

The switch UI logic module 264a can instruct endpoint 250a to display in a particular manner the first hundred contacts retrieved and transmitted by switch feature logic module 262a. The server UI logic module 274 can instruct endpoint 250a to display the rest of the contacts in another manner.

FIG. 2F therefore displays a configuration where switch 232a and server 234 have all or most of the feature logic and UI logic for certain telephony and application features. Accordingly, the endpoints 250a, 251 do not wait for instructions from server 234 for performing part of the feature controlled by switch 232a. Consequently, any network glitches between the server 234 and switch 232a or server 234 and endpoint 250a do not affect the execution of the part of feature controller by switch 232a.

Method Overview

Figure 3:
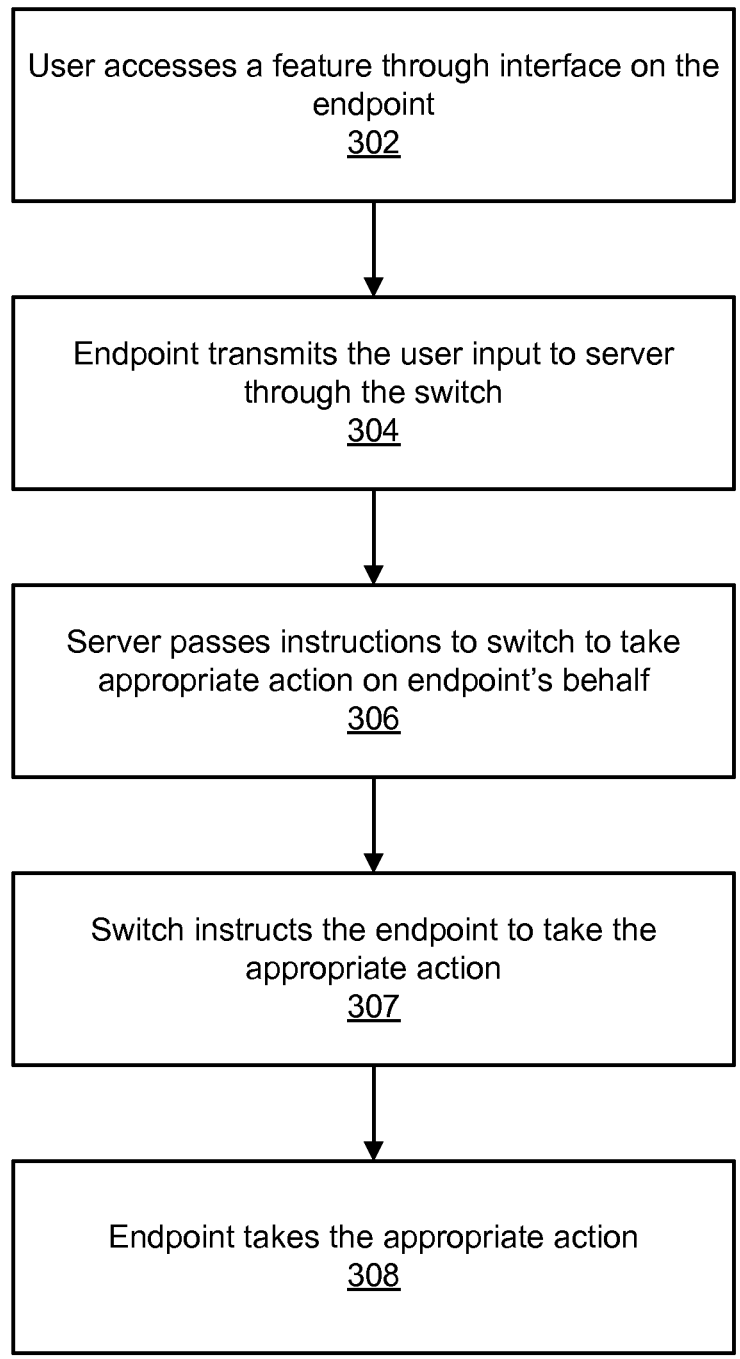
FIG. 3 illustrates a prior art method for implementing a feature on an endpoint.

FIG. 3 illustrates a prior art method for implementing a feature on an endpoint. The endpoint user accesses 302 a feature like displaying contacts through the endpoint's user interface. The user interface can include a button or a menu that allows access to the feature. For example, the user may select an option to view her personal contacts. The endpoint transmits 304 the user input to the server. If there is a network glitch or the server is not available for some reason, the endpoint can transmit the request again after a time interval. Once the server gets the request, the server performs the feature on the server and determines what should be displayed to the user. For example, the server may fetch the user's personal contacts from the database. The server then passes 306 instructions to switch to take appropriate action on endpoint's behalf. Next, the switch instructs 307 the endpoint and the endpoint takes 308 appropriate action. Referring to the example discussed above, the server may therefore instruct the switch that in turn instructs the endpoint to display the user's contact list. After the endpoint gets the instructions from the switch, the endpoint displays the list of user's contacts.

As discussed above, the prior art solution relies on the server to execute all the logic and instruct the endpoint to take appropriate action. The endpoint therefore requires a constant connection to the server for instructions on every step and any glitches in the network delays the endpoint's response to the user. The claimed invention distributes the feature logic across various entities in the distributed network and integrates intelligent modules in the entities to determine which entity performs a particular part of the requested feature and to determine methods of performing feature logic and user logic in tandem.

Figure 4:
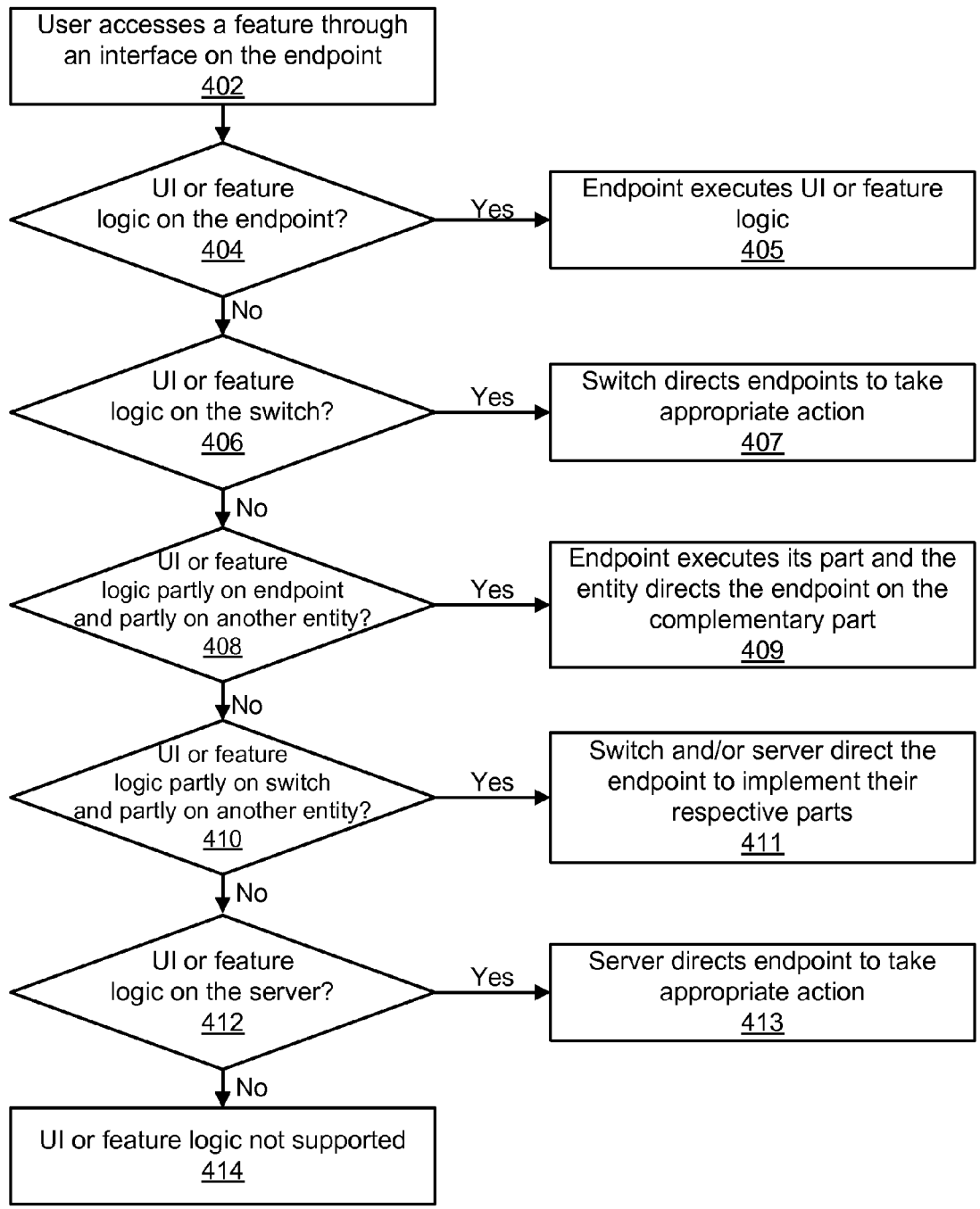
FIG. 4 illustrates a method for implementing UI logic and feature logic on an endpoint according to one embodiment of the invention.

FIG. 4 illustrates a method for implementing UI logic and feature logic on an endpoint according to one embodiment of the invention. One of ordinary skill in the art will know that endpoint 250a and switch 232a are used below in describing this method for illustration purposes. The method of FIG. 4 can be implemented between endpoints 250b and switch 230b or other endpoints and switches with similar capabilities.

The user of endpoint 250a accesses 402 a feature like accessing user contacts through the endpoint's user interface. The endpoint determination module 256a in endpoint 250a next determines 404 if endpoint feature logic module 252a has instructions for retrieving the contacts and endpoint UI logic module 254a has instructions for displaying the contacts. If the modules have the required instructions, endpoint 250a executes 405 the UI logic and feature logic itself.

If endpoint 250a is not capable of executing the UI logic or the feature logic, endpoint determination module 256a determines 406 if switch 232a can execute the UI logic and feature logic. If switch feature logic module 262a can execute the feature logic and switch UI logic module 264a has instructions for executing UI logic, switch 232a executes the logic and directs 407 endpoint 250a to take appropriate action.

If switch 232a cannot execute the UI logic or feature logic, endpoint determination module 256a determines 408 if endpoint 250a and switch 232a or server 234 include complementary implementations of user logic or feature logic. If yes, the endpoint 250a executes 409 its part and the server 234 or switch 232b execute their part and direct the endpoint 250a to take appropriate action. For example, a user may request a list of hundred contacts and endpoint 250*a* have only ten contacts in endpoint storage 259*a*. The endpoint 250*a* in this case will display the first ten contacts and request the other contacts from server 234 or switch 232*a*. Server 234 or switch 232*a* then retrieve the requested contacts from their respective storage, transmit the requested contacts to endpoint 250*a* and direct the endpoint 250*a* to display the transmitted contacts. In one embodiment, server 234 or switch 232*a* transmit the requested contact and do not direct endpoint 250*a* to display the contacts. Endpoint 250*a* in such an embodiment displays the received contacts without any directions from server 234 or switch 232*a*.

If endpoint 250 does not include a complementary implementation of user logic or feature logic, the endpoint determination module 256*a* determines 410 if server 234 and switch 232*a* include complementary implementations of user logic or feature logic. If yes, switch 232*a* and server 234 collectively direct 411 endpoint 250*a* to take appropriate actions. For example, in one embodiment, switch 232*a* may have the first ten contacts for a user and server 234 may have additional contacts for the user. In such an embodiment, the endpoint determination module 256*a* requests contacts through endpoint communication module 258*a* from switch 232*a*. The switch feature logic module 262*a* retrieves and transmits through switch communication module 268*a* the first ten requested contacts to endpoint 250*a*. Switch UI logic module 264*a* directs the endpoint to display the first ten contacts and switch determination module 266*a* or endpoint determination module 256*a* forwards the request for rest of the contacts to server 234. Server feature logic module 272 then retrieves and transmits the additional contacts to endpoint 250*a* through server communication module 268*a*. The server UI logic module 264*a* then directs endpoint 250*a* to display the additional contacts. In one embodiment, endpoint 250*a* displays the contacts on receiving the contacts and does not wait for directions from switch 232*a* or server 234 before displaying the contacts.

If switch 232*a* and endpoint 250*a* do not include complementary parts of the implementation, endpoint determination module 256*a* determines 412 if server 234 can execute the UI logic and feature logic. If yes, server feature logic module 272 and server UI logic module 274 directs 413 endpoint 250*a* to take appropriate action.

If server 234 cannot execute the UI logic or feature logic, server 234 directs 414 endpoint 250*a* to display an error message informing the user that the requested feature is not supported. In one embodiment, the endpoint determination module 256*a* determines that server 234 cannot execute the UI logic or feature logic and endpoint 250*a* displays an error message without any directions from server 234.

The illustrated method of FIG. 4 therefore beneficially attempts to execute the UI logic and feature logic at endpoints 250*a-b*, 251. If the logic can be performed at endpoints 250*a-b*, 251, the network glitches are least likely to affect the endpoints' response to user's selection because endpoints 250*a-b*, 251 do not wait for instructions from switches 232*a-b* or server 234 before performing the UI logic or feature logic. If the logic cannot be performed on endpoints 250*a-b*, 251, the illustrated method beneficially attempts to perform the logic at switches 232*a-b* and avoid any service interruptions due to network glitches between server 234 and switches 232*a-b* or server 234 and endpoints 250*a-b*, 251. A network glitch between server 234 and endpoints 250*a-b*, 251 is more likely than network glitch between the endpoints and their corresponding switches because a switch is more likely to be present on the same site as the endpoint and therefore the communication between the switch and the endpoints is unaffected by glitches in network connecting two sites.

The illustrated method of FIG. 4 also beneficially reduces the overhead per endpoint 250*a-b*, 251 for switches 232*a-b*. Because the endpoints 250*a-b*, 251, instead of switches 232*a-b*, perform at least a part of the UI logic or feature logic, switches 232*a-b* do not have to allocate resources for performing that logic. Switches 232*a-b* can therefore allocate lesser resources per endpoint and support more endpoints than previously possible.

The illustrated method of FIG. 4 includes decision boxes 404, 406, 408, 410, and 412. Even though the boxes are illustrated in a particular sequence in FIG. 4, one of ordinary skill in the art will know that the decision boxes may be implemented in another sequence without departing from the scope of the invention.

Figure 5:
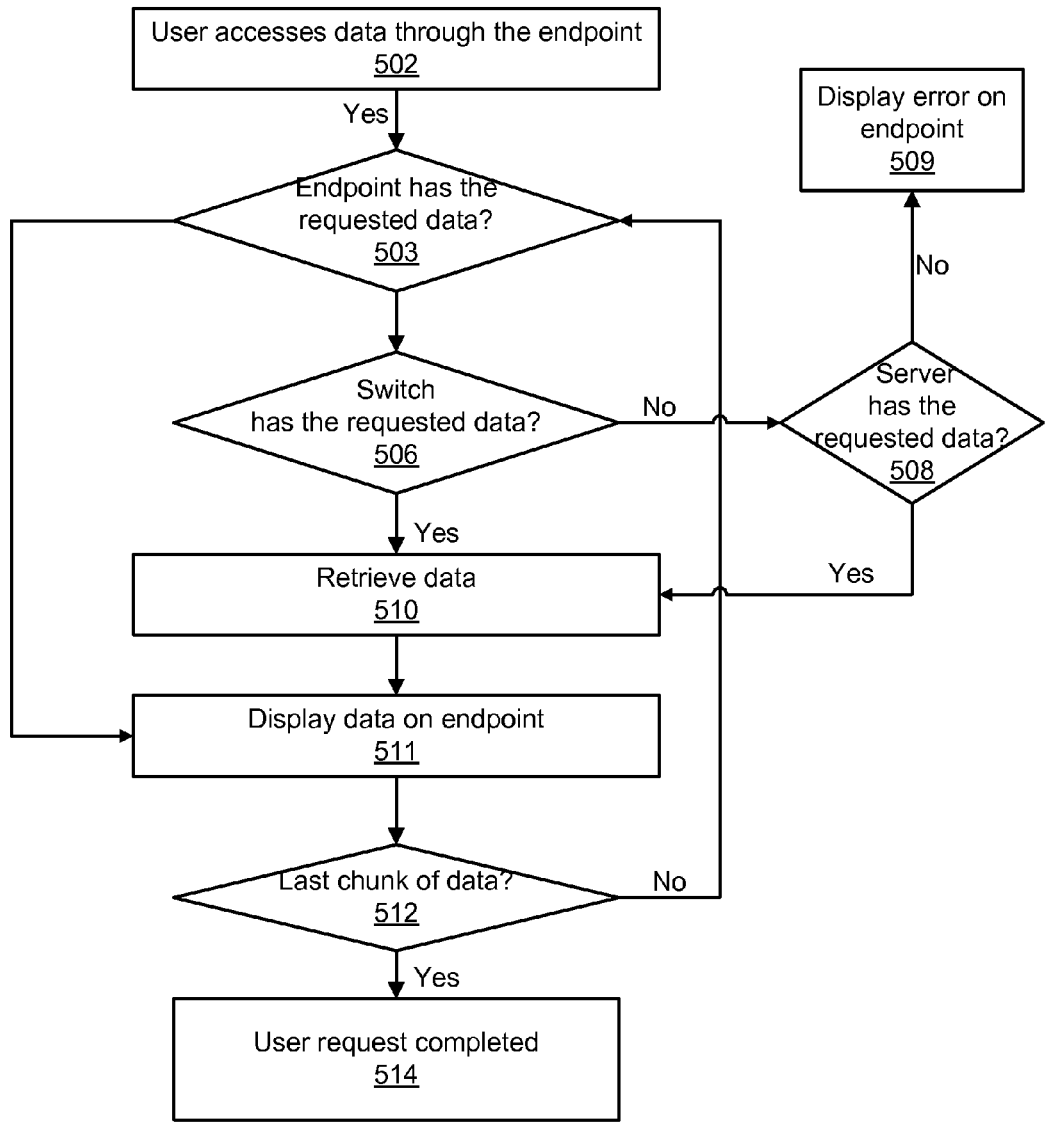
FIG. 5 illustrates another method for implementing UI logic and feature logic on an endpoint according to one embodiment of the invention.

FIG. 5 illustrates another method for implementing UI logic and feature logic on an endpoint according to one embodiment of the invention. One of ordinary skill in the art will know that endpoint 250*a* and switch 232*a* are used in this method for illustration purposes. The method of FIG. 5 can be implemented between endpoint 250*b* and switch 232*b* or other endpoints and switches with similar capabilities.

The user accesses 502 application data through the user interface on endpoint 250*a*. For example, the user may request a list of emails through user interface on endpoints 250*a*.

Upon receiving the request, the endpoint determination module 256*a* in endpoint 250*a* determines 503 if endpoint 250*a* has the requested email data. If yes, endpoint 250*a* displays 511 the data to the user. In one embodiment, endpoint 250*a* may have an initial chunk of the requested email data but not all of the requested data. For example, endpoint 250*a* may have the first hundred emails in storage 259*a* and endpoint 250*a* may display these first hundred emails to the user.

Endpoint feature logic module 252*a* then checks 512 if the displayed data is all of the requested data or the last chunk of requested data. If not, endpoint feature logic module 252*a* checks 503 if it has the next chunk of data. If yes, endpoint UI logic module 254*a* directs endpoint 250*a* to displays 511 the next chunk. If not, endpoint feature logic module 252*a* checks 504 switch 232*a* for the next chunk of data. If switch 232*a* has 506 the requested data, endpoint feature logic module 252*a* retrieves 510 the data from switch 232*a*. If switch 232*a* does not have the requested data, endpoint feature logic module 252*a* then checks 508 if server 234 has the requested data. If not, endpoint UI logic module 254*a* directs endpoint 250*a* to display 509 an error informing the user that requested data is not available. If server 234 has the requested data, endpoint feature logic module 252*a* retrieves 510 the data. Endpoint 250*a* then displays 511 the retrieved data to the user. Endpoint feature logic module 252*a* next checks 512 if the displayed data was the last chunk of requested data. If not, steps 503 to 511 are repeated until all the requested data is displayed to the user. Once endpoint 250*a* displays the last chunk of requested data, the user request is complete 514.

The illustrated method of FIG. 5 therefore beneficially searches for the retrieved data on endpoints 250*a-b*, 251 before retrieving the data from switches 232*a-b* or server 234. If the requested data is present on endpoints 250*a-b*, endpoints 250*a-b* retrieve the requested data from their memory and display the requested data to the user. Because endpoints 250*a-b* do not retrieve data from server 234 or switches 232*a-b*, network glitches do not affect the endpoints' response to user request. If the requested data is not available on endpoints 250*a-b*, 251, endpoints 250*a-b*, 251 retrieve the data from switches 232*a-b*. In one embodiment, the more frequently accessed data is preferably located on switches 232*a-b* instead of server 234 to avoid any service interruptions to user because of any network glitches between server 234 and switches 232*a-b* or server 234 and endpoints 250*a-b*, 251.

FIG. 5 illustrates the retrieval and display of requested application data. In one embodiment, the application data resides on server 234. Switches 232*a-b* and endpoints 252*a-b*, 251 have copies of parts of application data present on the server. The application data may be updated on server 234 through an update client (not shown) and switches 232*a-b* and endpoints 250*a-b*, 251 get these updates to display the most updated data to the user.

Figure 6:
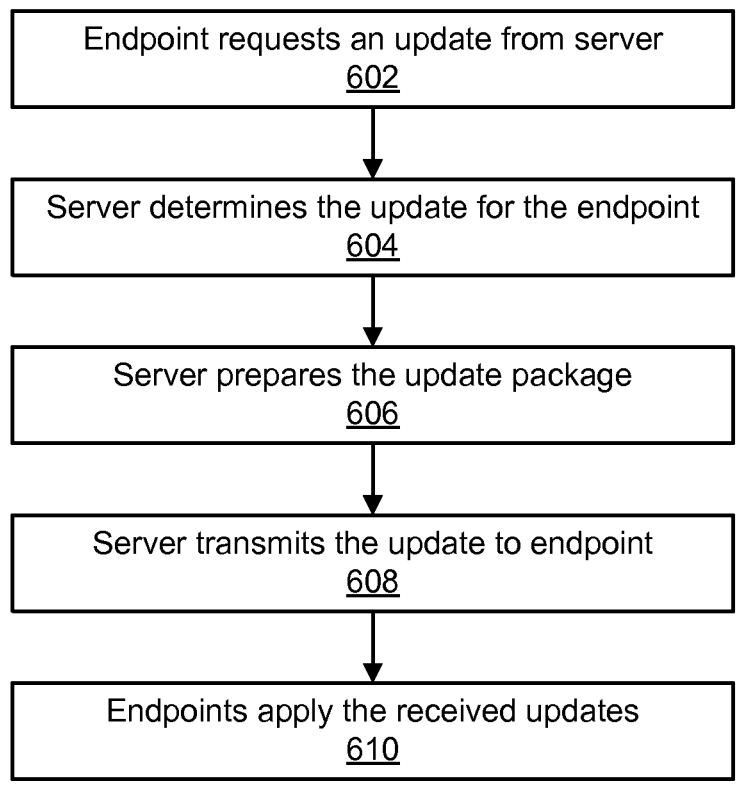
FIG. 6 illustrates a method for updating data on an endpoint according to one embodiment of the invention.

FIG. 6 illustrates a method for updating data on endpoints 250*a-b*, 251. A similar method can be used to update data on switches 232*a-b* or UI logic or feature logic on endpoints 250*a-b*, 251 and switches 232*a-b*. Endpoints 250*a-b*, 251 request 602 the relevant application data update from server 234. In one embodiment, server 234 pushes updates to endpoints 250*a-b*, 251 without endpoints 250*a-b*, 251 requesting the update. The update request may include a version number of the application data present on endpoints 250*a-b*, 251. In one embodiment, server 234 tracks the current version of application data on endpoints 250*a-b*, 251 and application data request need not include the application data version number.

After receiving the application request, server 234 determines 604 the data that should be updated on endpoints 250*a-b*, 251. In one embodiment, server 234 uses the version number of the application data to determine the new application data or changed application data. Server 234 then prepares 606 and transmits 608 to endpoints 250*a-b*, 251 an update package with new application data or the changed application data. On receiving the update, endpoints 250*a-b*, 251 apply 610 the received update to their application data.

The invention claimed is:

1. A voice over internet protocol telephony system with a first entity, the first entity comprising:

a determination module for (1) determining whether a first application feature requested by a user is performed at least in part by the first entity, (2) determining whether performance of the part of the first application feature by the first entity satisfies the request by the user, and (3) in response to a determination that performance of the first application feature by the first entity does not satisfy the request by the user, determining that a complementary portion of the first application feature is performed by one or more other entities in the telephony system, wherein the first application feature is accessible through an endpoint and the complementary portion of the first application feature, when executed, expands the first application feature without adding additional application features, and wherein the determination module obtains information about features partly supported by the first entity and partly supported by the one or more other entities, the information is available in one or more of the following: (a) a configuration file stored in storage, (b) another file format in storage, (c) hardcoded into the endpoint, (d) hardcoded into one or more switches, (e) hardcoded into a server, (f) the endpoint via a description protocol or via a repeated update message, (g) the one or more switches via the description protocol or via the repeated update message, and (h) the server via the description protocol or via the repeated update message; a communication module for communicating with at least one of the one or more other entities to perform the complementary portion of the first application feature, wherein the one or more other entities are configured to perform the complementary portion of the first application feature supported by the one or more other entities; a feature logic module for performing the part of the first application feature supported by the first entity; a user interface (UI) logic module for providing a user interface for presentation to a user; and a storage module for storing at least portion of data used for the first application feature.

2. The voice over internet protocol telephony system of claim 1 wherein the feature logic module in the first entity works in tandem with another feature logic module in at least one of the one or more other entities in the telephony system and the another feature logic module performs the complementary portion of the first application feature.

3. The voice over internet protocol telephony system of claim 1 wherein the UI logic module in the first entity works in tandem with another UI logic module in at least one of the one or more other entities in the telephony system and the another UI logic module performs the complementary portion of the first application feature.

4. The voice over internet protocol telephony system of claim 1 wherein the first entity is one from a group of an endpoint, a switch and a server.

5. The voice over internet protocol telephony system of claim 2 wherein the first entity is the endpoint and the one or more other entities include one or more of a switch and a server.

6. The voice over internet protocol telephony system of claim 2 wherein the first entity is a switch and the one or more other entities include one or more of the endpoint and a server.

7. The voice over internet protocol telephony system of claim 2 wherein the first entity is a server and the one or more other entities include one or more of the endpoint and a switch.

8. The voice over internet protocol telephony system of claim 3 wherein the first entity is the endpoint and the one or more other entities include one or more of a switch and a server.

9. The voice over internet protocol telephony system of claim 3 wherein the first entity is a switch and the one or more other entities include one or more of the endpoint and a server.

10. The voice over internet protocol telephony system of claim 3 wherein the first entity is a server and the one or more other entities include one or more of the endpoint and a switch.

11. A method for performing a first feature of an application accessible on an endpoint in a voice over internet protocol telephony system, the method comprising:

receiving at the endpoint a request by a user indicating selection of the first feature; determining whether a first entity performed at least a part of a feature logic of the first feature, the feature logic comprising instructions that help achieve an end result of the selected feature;

determining whether performance of the part of the first application feature by the first entity satisfies the request by the user;

determining a second entity that performs complementary feature logic in response to a determination that performance of the part of the first application feature by the first entity does not satisfy the request by the user, the complementary feature logic expanding the first feature without adding additional application features;

obtaining information about features partly supported by the first entity and partly supported by the second entity, the information is available in one or more of the following: (a) a configuration file stored in storage, (b) another file format in storage, (c) hardcoded into the endpoint, (d) hardcoded into one or more switches, (e) hardcoded into a server, (f) the endpoint via a description protocol or via a repeated update message, (g) the one or more switches via the description protocol or via the repeated update message, and (h) the server via the description protocol or via the repeated update message; and receiving an end result of the part of the feature logic for the first feature present at the determined first entity.

12. The method of claim 11 wherein the determined first entity is one from the group of the endpoint, a server in the telephony system and a switch in the telephony system.

13. The method of claim 11 comprising:
determining a user interface (UI) entity that performs at least a part of a user interface (UI) logic of the feature, the UI logic comprising instructions for rendering data or other components of the application; and
receiving from the determined UI entity instructions for rendering data or other components of the application.

14. The method of claim 13 wherein the determined UI entity is one from the group of a UI logic module in the endpoint, a server in the telephony system and a switch in the telephony system.

15. The method of claim 13 comprising:
requesting the determined UI entity perform the part of the UI logic present at the determined UI entity.

16. A voice over internet protocol telephony system, the system comprising:
an endpoint comprising an endpoint determination module for (1) determining whether an entity in the telephony system individually or collectively performed at least part of a feature of an application accessible through the endpoint in response to a request by a user, (2) in response to a determination that performance of the at least part of the feature of the application by the first entity does not satisfy the request by the user, determining at least one other entity in the telephony system that supports a complementary portion of the feature of the application, and (3) obtaining information about features partly supported by the first entity and partly supported by the at least one other entity, the information is available in one or more of the following: (a) a configuration file stored in storage, (b) another file format in storage, (c) hardcoded into the endpoint, (d) the one or more switches via the description protocol or via the repeated update message, and (e) the server via the description protocol or via the repeated update message;
a switch comprising a switch determination module for (1) determining whether the entity in the telephony system individually or collectively performed at least part of the feature of the application accessible through the endpoint in response to a request by a user, (2) in response to a determination that performance of the at least part of the feature of the application by the first entity does not satisfy the request by the user, determining at least one other entity in the telephony system that supports a complementary portion of the feature of the application, and (3) obtaining information about features partly supported by the first entity and partly supported by the at least one other entity, the information is available in one or more of the following: (a) a configuration file stored in storage, (b) another file format in storage, (c) hardcoded into the switch, (d) the endpoint via a description protocol or via a repeated update message, and (e) the server via the description protocol or via the repeated update message; and a server comprising a server determination module for (1) determining whether the entity in the telephony system individually or collectively performed at least part of the feature of the application accessible through the endpoint in response to a request by a user, (2) in response to a determination that performance of the at least part of the feature of the application by the first entity does not satisfy the request by the user, determining at least one other entity in the telephony system that supports a complementary portion of the feature of the application, and (3) obtaining information about features partly supported by the first entity and partly supported by the one other entity, the information is available in one or more of the following: (a) a configuration file stored in storage, (b) another file format in storage, (c) hardcoded into the server, (d) the endpoint via a description protocol or via a repeated update message, and (e) one or more switches via the description protocol or via the repeated update message, the complimentary portion for expanding the feature of the application without adding additional application features.

17. The telephony system of claim 16 wherein the endpoint further comprises an endpoint feature logic module comprising instructions that help achieve an end result of the feature.

18. The telephony system of claim 17 wherein the endpoint feature logic module works in tandem with another feature logic module comprising complementary instructions for achieving the end result of the feature, the another feature logic module included in one or more of the switch and the server.

19. The telephony system of claim 16 wherein the endpoint further comprises an endpoint user interface (UI) module comprising at least a part of instructions for rendering data or other components of the application.

20. The telephony system of claim 19 wherein the endpoint UI module works in cooperation with another UI module comprising complementary instructions for providing a user interface for presentation to the user, the another UI module residing in one or more of the switch and the server.

* * * * *